United States Patent
Ashino et al.

(10) Patent No.: US 10,468,204 B2
(45) Date of Patent: Nov. 5, 2019

(54) CAPACITOR AND MANUFACTURING METHOD THEREFOR

(71) Applicant: NIPPON CHEMI-CON CORPORATION, Tokyo (JP)

(72) Inventors: Hirotsugu Ashino, Tokyo (JP); Fusayoshi Endoh, Tokyo (JP); Daizou Senzai, Tokyo (JP); Takahiro Yoshida, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days.

(21) Appl. No.: 15/433,471

(22) Filed: Feb. 15, 2017

(65) Prior Publication Data

US 2017/0162341 A1 Jun. 8, 2017

Related U.S. Application Data

(63) Continuation of application No. PCT/JP2015/004206, filed on Aug. 21, 2015.

(30) Foreign Application Priority Data

Aug. 22, 2014 (JP) .................................. 2014-169677
Aug. 22, 2014 (JP) .................................. 2014-169678

(Continued)

(51) Int. Cl.
*H01G 9/15* (2006.01)
*H01G 9/00* (2006.01)
(Continued)

(52) U.S. Cl.
CPC ............. *H01G 11/82* (2013.01); *H01G 9/008* (2013.01); *H01G 9/0029* (2013.01); *H01G 9/02* (2013.01);
(Continued)

(58) Field of Classification Search
CPC .......... H01G 4/224; H01G 4/32; H01G 4/245; H01G 9/151; H01G 9/0029; H01G 9/048;
(Continued)

(56) References Cited

U.S. PATENT DOCUMENTS

| 4,352,147 A * | 9/1982 | Elias | H01G 9/00 361/512 |
| 7,495,889 B2 * | 2/2009 | Will | H01G 9/06 361/517 |

(Continued)

FOREIGN PATENT DOCUMENTS

| CN | 101641754 A | 2/2010 |
| EP | 2133896 A1 | 12/2009 |

(Continued)

OTHER PUBLICATIONS

International Search Report dated Oct. 20, 2015, issued in counterpart application No. PCT/JP2015/004206, w/ English translation. (5 pages).

(Continued)

*Primary Examiner* — Eric W Thomas
*Assistant Examiner* — Arun Ramaswamy
(74) *Attorney, Agent, or Firm* — Westerman, Hattori, Daniels & Adrian, LLP

(57) ABSTRACT

A capacitor includes a capacitor element having electrode foils on the anode side and the cathode side laminated via separators, connecting parts of terminal components being disposed inside a laminated portion of the electrode foils and the separators, the connecting parts being connected to the electrode foils on the anode side and the cathode side; and a case that includes a storage part storing the capacitor element and having an opening portion sealed by a sealing body, that has a crimped part crimped from the outside of the storage part toward a side surface of the capacitor element, (Continued)

and that holds the capacitor element with the crimped part. The case is crimped to form the crimped part while avoiding a position at which the electrode foils of the capacitor element in the storage part overlap with tip portions of the connecting parts of the terminal components.

5 Claims, 7 Drawing Sheets

(30) Foreign Application Priority Data

Aug. 22, 2014 (JP) .................................. 2014-169679
Aug. 22, 2014 (JP) .................................. 2014-169680

(51) Int. Cl.

| | |
|---|---|
| *H01G 9/048* | (2006.01) |
| *H01G 9/08* | (2006.01) |
| *H01G 9/10* | (2006.01) |
| *H01G 11/80* | (2013.01) |
| *H01G 11/84* | (2013.01) |
| *H01G 11/86* | (2013.01) |
| *H01G 11/74* | (2013.01) |
| *H01G 4/32* | (2006.01) |
| *H01G 4/224* | (2006.01) |
| *H01G 4/245* | (2006.01) |
| *H01G 11/82* | (2013.01) |
| *H01G 9/02* | (2006.01) |
| *H01G 11/52* | (2013.01) |
| *H01G 9/008* | (2006.01) |
| *H01G 9/06* | (2006.01) |
| *H01G 11/78* | (2013.01) |

(52) U.S. Cl.
CPC .............. *H01G 9/048* (2013.01); *H01G 9/06* (2013.01); *H01G 9/10* (2013.01); *H01G 9/151* (2013.01); *H01G 11/52* (2013.01); *H01G 11/74* (2013.01); *H01G 11/80* (2013.01); *H01G 11/86* (2013.01); *H01G 9/08* (2013.01); *H01G 11/78* (2013.01); *Y02E 60/13* (2013.01)

(58) Field of Classification Search
CPC . H01G 9/08; H01G 9/10; H01G 11/86; H01G 11/80; H01G 11/84; H01G 11/74
USPC .......... 361/301.5, 301.1, 511, 518, 517, 530, 361/535
See application file for complete search history.

(56) References Cited

U.S. PATENT DOCUMENTS

| | | | |
|---|---|---|---|
| 2003/0117762 A1 | 6/2003 | Takeishi et al. | |
| 2007/0121276 A1 | 5/2007 | Uzawa et al. | |
| 2012/0154984 A1* | 6/2012 | Ashino | .................. H01G 9/008 361/517 |

FOREIGN PATENT DOCUMENTS

| | | |
|---|---|---|
| JP | 64-26830 U | 2/1989 |
| JP | 4-326505 A | 11/1992 |
| JP | 5-79938 U | 10/1993 |
| JP | H09-293529 A | 11/1997 |
| JP | 10-22177 A | 1/1998 |
| JP | 2003-173942 A | 6/2003 |
| JP | 2005-303062 A | 10/2005 |
| JP | 2007-103533 A | 4/2007 |
| JP | 2008-109074 A | 5/2008 |
| JP | 2013-041894 A | 2/2013 |
| JP | 2013-077651 A | 4/2013 |
| KR | 10-2009-0125196 A | 12/2009 |
| WO | 2008/129729 A1 | 10/2008 |

OTHER PUBLICATIONS

Written Opinion dated Oct. 20, 2015, issued in counterpart International Application No. PCT/JP2015/004206. (4 pages).
International Preliminary Report on Patentability (Form PCT/IB/338) issued in counterpart International Application No. PCT/JP2015/004206 dated Mar. 9, 2017, with Forms PCT/IB/373, PCT/ISA/237, and PCT/IB/328. With English translation. (14 pages).
Office Action dated May 15, 2018, issued in counterpart Japanese application No. 2014-169680, with English translation. (6 pages).
Office Action dated May 15, 2018, issued in counterpart Japanese application No. 2014-169678, with English translation. (6 pages).
Office Action dated May 29, 2018, issued in counterpart Japanese application No. 2014-169679, with English translation. (6 pages).
Office Action dated Jul. 31, 2018, issued in counterpart Japanese Application No. 2014-169678, with partial English machine translation. (6 pages).
Office Action dated Feb. 2, 2018, issued in counterpart Chinese Application No. 201580043725.1, with partial English machine translation. (13 pages).
Extended (supplementary) European Search Report dated Feb. 21, 2018, issued in counterpart European Application No. 15834394.7. (8 pages).

* cited by examiner

CAPACITOR AND MANUFACTURING METHOD THEREFOR

CROSS-REFERENCE TO RELATED APPLICATIONS

This application is a continuation of International Application No. PCT/JP2015/004206, filed on Aug. 21, 2015, which is entitled to the benefit of priority of Japanese Patent Application No. 2014-169677, filed on Aug. 22, 2014, Japanese Patent Application No. 2014-169678, filed on Aug. 22, 2014, Japanese Patent Application No. 2014-169679, filed on Aug. 22, 2014, and Japanese Patent Application No. 2014-169680, filed on Aug. 22, 2014, the contents of which are hereby incorporated by reference.

BACKGROUND OF THE INVENTION i) Field of the Invention

A technique of the present disclosure relates to a technique for fixing a capacitor element sealed in a case.

ii) Description of the Related Art

A capacitor such as an electrolytic capacitor and an electric double layer capacitor has a capacitor element stored in a case. Capacitors are increasingly mounted on automobiles etc., and intense vibrations continuously act on the capacitors. In a vehicle-mounted capacitor, for example, a case and a capacitor element, or terminal components connected to the capacitor element, may be damaged by acting a large force on a portion due to vibrations. Therefore, in known capacitors, a fixing material is enclosed in a case, or a case and a capacitor element are integrated and fixed by crimping a case side surface.

Such capacitors include a capacitor having a capacitor element and a case contacting with and fixing to each other by pressing and crimping a portion of a side surface of a metal case (e.g., Japanese Unexamined Utility Model Application Publication No. 64-026830 and Japanese Laid-Open Patent Publication No. 2008-109074).

BRIEF SUMMARY OF THE INVENTION

To improve vibration resistance, a capacitor is subjected to a crimping process at a plurality of positions in accordance with an arrangement position of a capacitor element stored in a case along a circumferential surface of the case. Crimping positions in this case are set to positions at which the capacitor element and the case on the exterior side of the capacitor element overlap with each other. Out of a plurality of the crimping positions, two crimping positions on the outside along the capacitor element are set to positions close to end surfaces of the capacitor element. In particular, for example, if a crimping position overlaps with a connecting portion to a sealing body on the upper side of the case or is set to a position close to the bottom of the case and the capacitor is crimped at a position where the case and the capacitor element stored therein are in a non-overlapping state or an incompletely overlapping state, the fixing force as expected cannot be provided to the capacitor element.

If a crimping position is set in a portion other than both end portions of the capacitor element, the crimping position may be set to a position overlapping with an end portion of a terminal component connected inside electrode foils. The terminal component is made of metal such as aluminum, and one end of a columnar shape of aluminum is connected to a lead wire connected to the outside while the other end has a flat-shaped connecting part formed to obtain a connection position with the electrode foil. A corner portion exists on an end surface of the connecting part having such a shape. The crimping process has a problem that, when the position of the corner portion is crimped on the end portion side of the connecting part, a pressing force may act on a contact portion with the corner portion and the electrode foils and separators may be partially strongly pressed to result in damage.

Japanese Unexamined Utility Model Application Publication No. 64-026830 and Japanese Laid-Open Patent Publication No. 2008-109074 do not disclose or suggest such a requirement and a problem and do not disclose or suggest a configuration etc. for solving the problem.

It is therefore an object of techniques of the present disclosure to improve vibration resistance of a capacitor and maintain the reliability of the capacitor by appropriately setting a crimping position.

An aspect of a capacitor of the present invention includes a capacitor element having electrode foils on the anode side and the cathode side laminated via separators, connecting parts of terminal components being disposed inside a laminated portion of the electrode foils and the separators, the connecting parts being connected to the electrode foils on the anode side and the cathode side; and a case that includes a storage part storing the capacitor element and having an opening portion sealed by a sealing body, that has a crimped part crimped from the outside of the storage part toward a side surface of the capacitor element, and that holds the capacitor element with the crimped part, wherein the case is crimped to form the crimped part while avoiding a position at which the electrode foils of the capacitor element in the storage part overlap with tip portions of the connecting parts of the terminal components.

An aspect of a manufacturing method for a capacitor of the present invention includes forming a capacitor element having electrode foils on the anode side and the cathode side laminated via separators, connecting parts of terminal components being disposed inside a laminated portion of the electrode foils and the separators, the connecting parts being connected to the electrode foils on the anode side and the cathode side respectively; calculating a position at which tip portions of the connecting parts of the terminal components are located with respect to the inside of the capacitor element; setting a crimping position while avoiding the calculated position overlapping with the tip portions of the connecting parts of the terminal components; and crimping a case that includes a storage part from the outside of the storage part toward a side surface of the capacitor element at the crimping position to form a crimped part holding the capacitor element, the storage part storing the capacitor element and having an opening portion sealed by a sealing body.

Other objects, features, and advantages of the present invention will become more apparent by reference to the accompanying drawings and embodiments.

DETAILED DESCRIPTION OF THE INVENTION

First Embodiment

Figure 1:
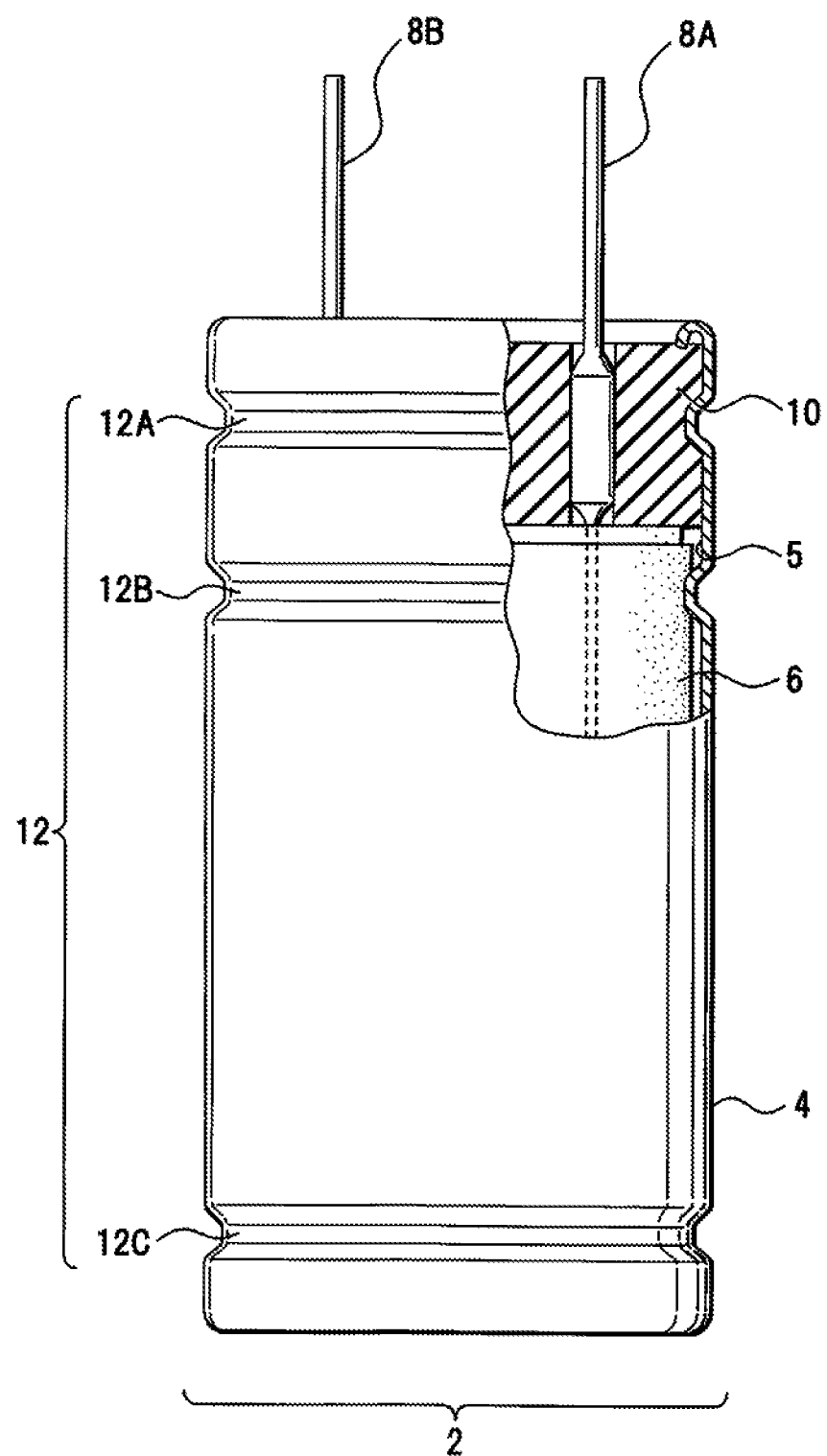
FIG. 1 is a diagram of an example of configuration of a capacitor according to a first embodiment.

FIG. 1 shows an example of configuration of a capacitor according to a first embodiment. This capacitor 2 may be any capacitor such as an electrolytic capacitor or an electric double layer capacitor.

This capacitor 2 has a capacitor element 6 stored in an exterior case 4 using a metal member of aluminum etc. The exterior case 4 is an example of a case of the present disclosure and functions as an exterior member of the capacitor 2 including a storage part 5 storing the capacitor element 6 in the storage part 5. The exterior case 4 is formed into a cylindrical shape having a bottom, for example, and a cylindrical portion of the exterior case 4 is an example of a storage part and stores the capacitor element 6 as well as an electrolytic solution etc. not shown in the exterior case 4. The exterior case 4 may be made of a metal such as aluminum or a hard material such as an aluminum alloy to which manganese or magnesium is added. By using the exterior case 4 made of a hard material, even when the capacitor 2 is used under a high temperature environment, crimped parts 12B, 12C described later are not loosened due to high temperature and a fixing force can be maintained.

The capacitor element 6 is formed into a columnar shape in which electrode foils on the anode side and the cathode side are laminated via separators, for example. External terminals 8A, 8B on the anode side and the cathode side are disposed on one end side of the capacitor element 6. The external terminals 8A, 8B are an example of terminal components electrically connected to an electric circuit such as a substrate not shown and, for example, one end sides of the external terminals 8A, 8B are disposed inside the capacitor element 6 and connected to the electrode foils of the capacitor element 6 while the other end sides protrude to the outside from the end surface side of the capacitor element 6.

When a sealing body 10 is disposed on an opening portion of the exterior case 4, the storage part 5 is sealed from the outside. The sealing body 10 is an example of a sealing body of the present disclosure and is made of an elastic body such as rubber to block air, moisture, etc. from the housing part 5. It is noted that the sealing body 10 may include, for example, a vent hole not shown or a vent valve allowing only gas to pass through the vent hole.

The sealing body 10 allows the external terminals 8A, 8B to penetrate through a portion of a planar portion of the sealing body 10 sealing the storage part 5. Additionally, the sealing body 10 is in a pressed state against a portion of an opening end portion side due to a curling process to an opening portion of the exterior case 4, for example.

The capacitor 2 has crimped parts 12 formed by pressing and deforming the outer circumferential surface of the exterior case 4 along the circumferential direction. The crimped parts 12 press against portions of the capacitor element 6 and the sealing body 10 with the deformation of the exterior case 4 and thereby integrate the sealing body 10 and the capacitor element 6 with the exterior case 4. The crimped parts 12 include a crimped part 12A on the side surface of the sealing body 10 as well as a crimped part 12B crimping a position of the capacitor element 6 close to the opening side of the exterior case 4 and a crimped part 12C crimping a position of the capacitor element 6 close to the bottom side of the exterior case 4.

The crimped part 12A presses the sealing body 10 from the outside to integrate and fix the sealing body 10 with the side surface of the exterior case 4 so as to enhance the sealing property of the opening portion of the exterior case 4.

The crimped part 12B is an example of a first crimped part and is formed on the capacitor element 6 at a position close to the opening side of the storage part 5, for example, and fixes the capacitor element 6 to the exterior case 4. The formation position of the crimped part 12B is set to a position at which a laminated portion of the electrode foils and the separators of the capacitor element 6 overlaps with the external terminals 8A, 8B. Additionally, the crimped part 12B avoids tip portions of the external terminals 8A, 8B arranged on the electrode foils and is formed so as not to overlap with corner portions formed on the tip portions of the external terminals.

The crimped part 12C is an example of a second crimped part and is formed at a position close to an end portion of the capacitor element 6 disposed on the bottom side of the exterior case 4 while avoiding the external terminals 8A, 8B, so as to fix the capacitor element 6 inside the storage part 5. Consequently, the formation position of the crimped part 12C is set on the capacitor element 6 such that the electrode foils do not overlap with the external terminals 8A, 8B.

<Assembling of Capacitor 2>

In the capacitor 2, the external terminals 8A, 8B are connected to one end surface of the capacitor element 6 for the capacitor element 6 to protrude tip portions of the external terminals 8A, 8B and the capacitor element 6 is disposed in the storage part 5 of the exterior case 4. The sealing body 10 sealing the exterior case 4 has through-holes matched with the protruding positions of the external terminals 8A, 8B so as to expose the tip portions of the external terminals 8A, 8B outside the sealing body 10. The through-holes may be formed as openings sized to closely contact with outer circumferential surfaces of large diameter portions that are portions of the external terminals 8A, 8B, for example, so as to maintain the sealing performance inside the storage part 5.

The capacitor element 6 has a columnar shape formed by rolling the electrode foils on the anode side and the cathode side and the separators interposed between the electrode foils into a pillar shape with a wrapping stop tape 14 wrapped around an outer circumferential portion of the rolled electrode foils and separators. The wrapping stop tape 14 may be, for example, a paper or insulating tape having a length equal to that of one side of the electrode foils and covers the circumference of the electrode foils. As a result, the crimped parts 12B, 12C are formed on the capacitor 2 within a range in which the wrapping stop tape 14 is wrapped. This enables the wrapping stop tape 14 to act as a buffer material when the capacitor element 6 is pressed by the crimping process, so that the electrode foils and the separators can be prevented from being damaged due to pressing. It is more preferable that the wrapping stop tape 14 be wrapped around multiple times. If such a layer of the wrapping stop tape 14 is formed, a buffering function is enhanced and the influence on the electrode foils and the separators can further be reduced. The thickness of the layer of the wrapping stop tape 14 is preferably 200 to 600 [μm]. In the case of less than 200 [μm], the effect of the buffering action against the pressing force due to the crimping process is low. In the case of greater than 600 [μm], the exterior case 4 for storage must be enlarged, so that a reduction in size is which prevented.

In an assembling process of the capacitor 2, the capacitor element 6 rolled into a diameter smaller than the storage part 5 of the exterior case 4, an electrolytic solution, etc. are stored in the storage part 5, and the sealing body 10 is then placed and sealed on the opening side of the exterior case 4. Subsequently, the capacitor 2 is subjected to the crimping process along a circumferential surface of the sealing body 10 and then subjected to the crimping process on the electrode foil side.

<Example of Configuration of Capacitor Element 6>

Figure 2:
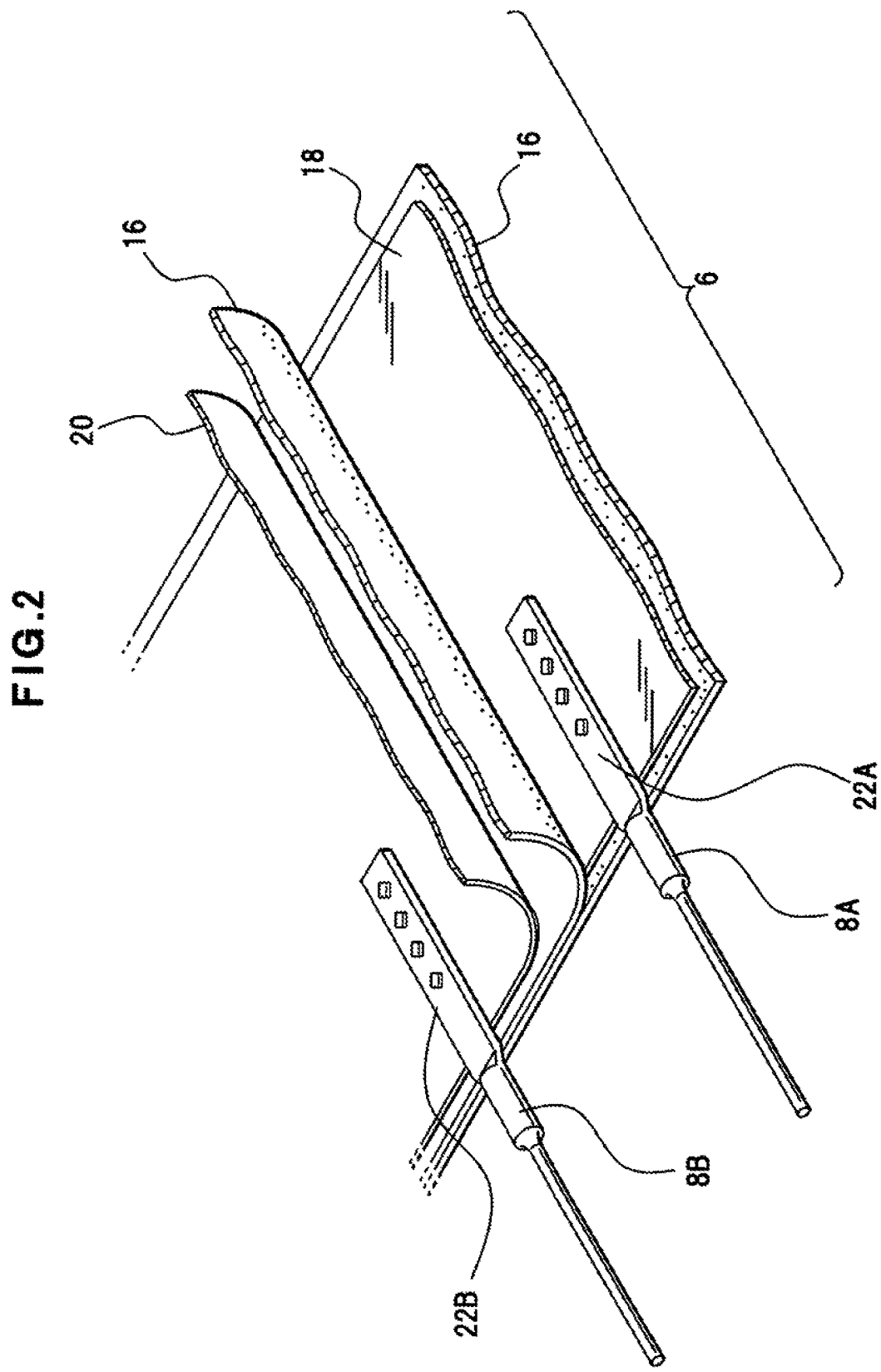
FIG. 2 is a diagram of an example of disposition of terminal components on electrode foils.

For example, as shown in FIG. 2, the capacitor element 6 is in a laminated state in which respective separators 16 are interposed for an anode foil 18 and a cathode foil 20. The anode foil 18 and the cathode foil 20 are formed of, for example, aluminum foils having a chemical conversion coating formed thereon. The anode foil 18 and the cathode foil 20 are connected to one end sides of the external terminals 8A, 8B, respectively.

The external terminals 8A, 8B include, for example, flat-shaped connecting parts 22A, 22B as a connecting part connected to the anode foil 18 and a connecting part connected to the cathode foil 20. The connecting parts 22A, 22B are connected to the anode foil 18 or the cathode foil 20 by stitch connection, for example. The connecting parts 22A, 22B are formed into, for example, a flat plate shape and thereby brought into surface contact with the electrode foils and the separators 16, so that the contact properties are ensured.

The capacitor element 6 has the anode foil 18, the cathode foil 20, and the separators 16 rolled in the laminated state. In this state, the external terminals 8A, 8B have the connecting parts 22A, 22B arranged inside the roll and put into a connected state with the electrode foils while being subjected to pressure due to rolling.

<Setting of Crimping Position>

Figure 3:
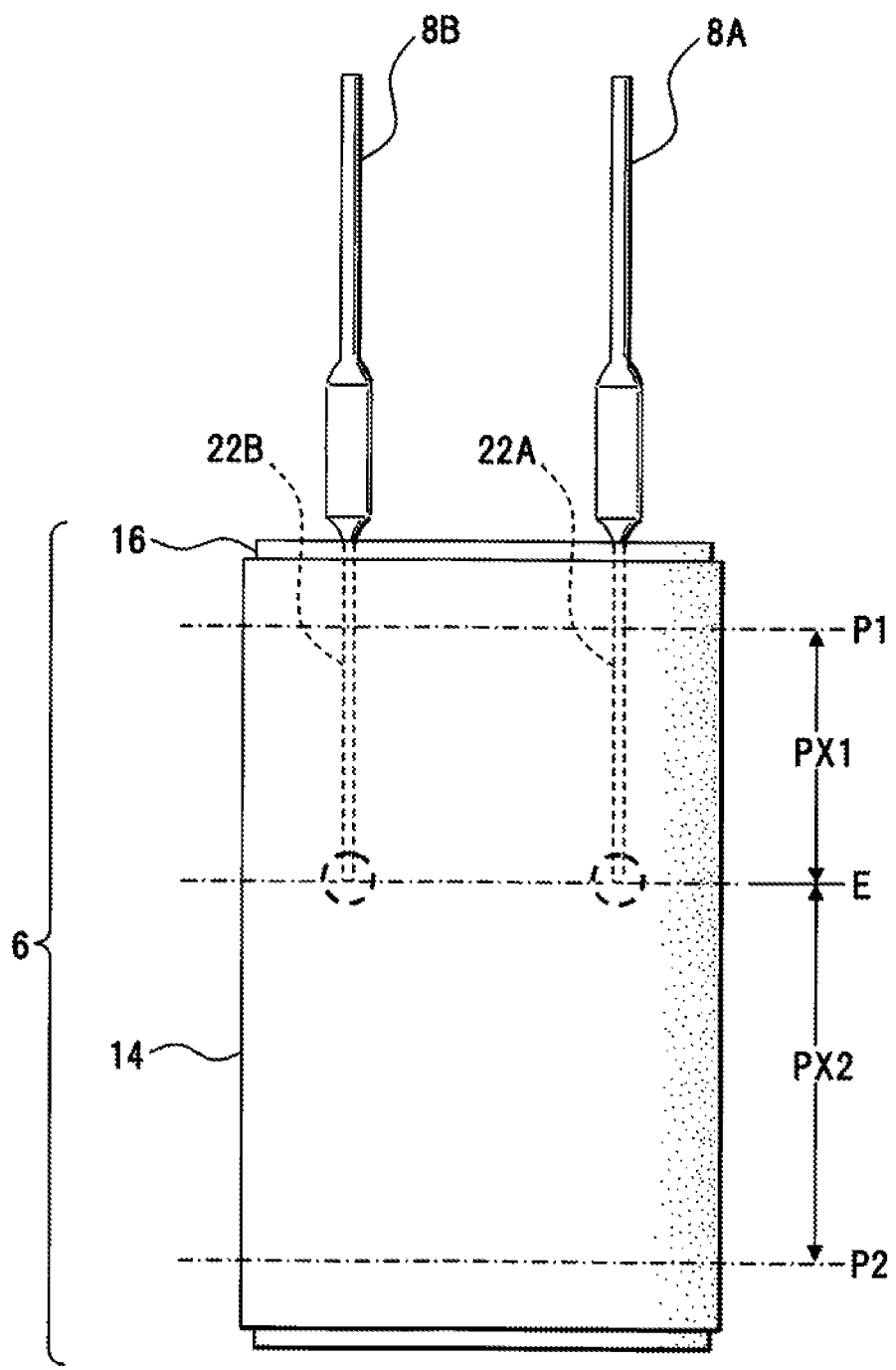
FIG. 3 is a diagram of an example of setting of a crimping position with respect to a capacitor element.

For example, as shown in FIG. 3, crimping positions of the capacitor 2 are set on the capacitor element 6 while avoiding a position E at which the tip portions of the external terminals 8A, 8B are arranged, so that the position E is not pressed. Consequently, the crimping position of the first crimped part 12B pressing the position overlapping with the connecting parts 22A, 22B is set, for example, on the exterior case 4 at a position P1 separated by a predetermined distance PX1 from the position E in the connection direction of the external terminals 8A, 8B. The crimping position of the second crimped part 12C pressing the position not overlapping with the connecting parts 22A, 22B is set on the exterior case 4 at a position P2 separated by a predetermined distance PX2 from the position E toward the bottom side of the exterior case 4.

These crimping positions P1, P2 may be set, for example, on the exterior case 4 such that the positions are separated by the same distance in respective opposite directions from the position E as a basis or may be set in accordance with a distance from the position E to the end portions of the electrode foils. The crimping positions P1, P2 are both preferably set to positions close to the respective ends of the capacitor element 6 so as to increase the strength of supporting of the capacitor element 6 by the exterior case 4, for example. As a result, the capacitor element 6 is supported by the exterior case 4 at the positions close to the upper end side and the lower end side, for example, so that the capacitor element 6 can be restrained from being in a vibrating state in the exterior case 4. For example, if the crimping positions P1, P2 are set to close positions on the center side of the capacitor element 6, the capacitor element 2 may vibrate in the storage part 5 with one or both of the crimped parts 12B, 12C as a supporting point due to vibrations received from the outside. If the capacitor element 6 vibrates as described above, a stress concentrates on portions of the external terminals 8A, 8B since the tip sides of the external terminals 8A, 8B are fixedly connected to a substrate etc., so that breakage etc. may occur. However, by crimping the positions close to the upper and lower end portions of the capacitor element 6 and separating the crimping positions from each other, the capacitor element 6 can be restrained from vibrating in the exterior case 4.

For example, the crimping positions P1, P2 of the capacitor 2 may be set to positions across the positions of the center of gravity or the center position of the capacitor element 6 as a basis, or may be set to positions across the position of the center of gravity of the capacitor 2 including the sealing body 10, the external terminals 8A, 8B, etc. or the center position of the exterior case 4. By pressing and fixing the capacitor element 6 such that the center of gravity is located in between, the vibrations in the exterior case 4 can further be prevented. More specifically, it is desirable that the crimping positions P1, P2 are set on the exterior case 4 at positions on the inner side shifted toward the position E by a predetermined length from the end surface portions of the capacitor element 6. By setting the crimping positions avoiding the end surface portions of the electrode foils, the crimping can be achieved while avoiding burrs generated on a cutting surface when the anode foil 18 is cut to a predetermined length. In this way, the burrs can be prevented from being pressed by the crimped parts 12B, 12C and possibly breaking through the separators 16 and causing a short circuit.

<Crimping Process on Exterior Case 4>

Figure 4:
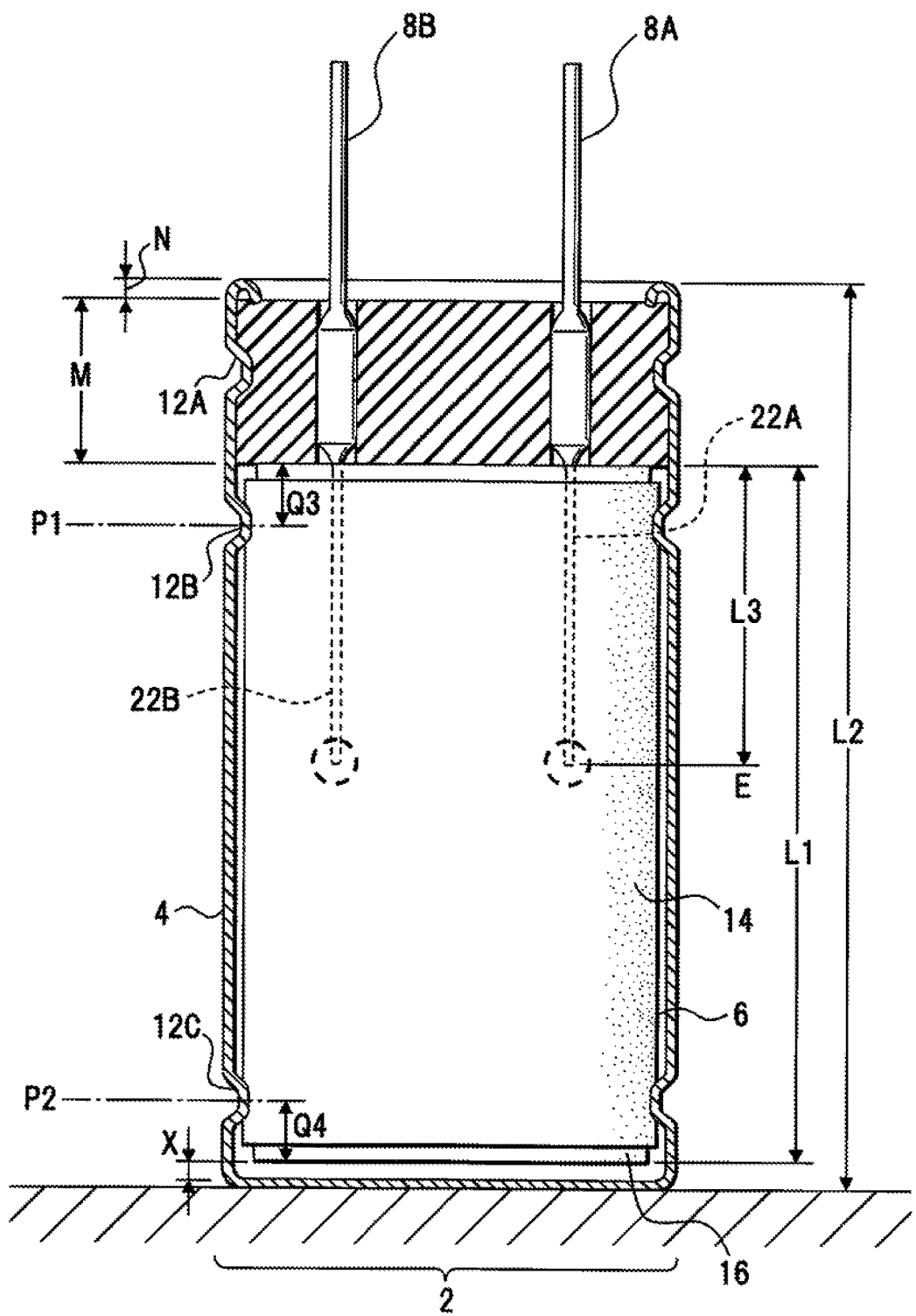
FIG. 4 is a diagram of an example of setting of a crimping position in manufacturing of the capacitor.

In the crimping process for the capacitor 2, for example, as shown in FIG. 4, a crimping position is specified based on the opening side or the bottom surface side of the exterior case 4 to execute the crimping process. The crimping positions are set by utilizing preliminarily acquired size information of components such as the capacitor element 6 and the sealing body 10, for example, while avoiding the position E at which the tip portions of the connecting parts 22A, 22B are located in the storage part 5.

Specifically, in manufacturing of the capacitor 2, for example, size information such as a length L1 of the rolled capacitor element 6, a length L2 of the exterior case 4, a length M of the sealing body 10, and a length L3 of the connecting parts 22A, 22B is preliminarily measured. Additionally, in the storage part 5, for example, a gap N may be formed by a curling process between the opening portion and the sealing body 10, and a predetermined interval X may be generated between the bottom of the storage part 5 and the end surface of the capacitor element 6. By setting the interval X, the capacitor 2 can allow the capacitor element 6 to deform due to crimping and can reduce a deformation stress generated in the capacitor element 6. The end surface of the capacitor element 6 may closely contact the bottom surface of the exterior case 4 without setting the interval X. In the crimping process, for example, the position E of the tip portions of the external terminals 8A, 8B may be calculated based on these pieces of the length information so as to set the positions of the crimped parts 12B, 12C based on the position E.

In the assembling of the capacitor 2, the crimping process is executed on the circumferential surface of the sealing body 10, and the crimping process is then executed on the circumferential surface of the electrode foils at the positions set while avoiding the calculated position E. In the crimping processes, a crimping die not shown is pressed against the exterior case 4 along the circumferential surface of the exterior case 4 to crimp the exterior case 4 by pressing.

Function and Effect of First Embodiment (1) This capacitor 2 is subjected to the crimping process at positions avoiding the tip portions of the connecting parts 22A, 22B of the external terminals 8A, 8B. In other words, the crimped parts 12B, 12C of the capacitor 2 are not set at a position overlapping with the tip portions of the connecting parts 22A, 22B. As a result, since no excessive load acts on portions of the electrode foils due to the crimping process and at the corner portions formed on the connecting parts 22A, 22B, the capacitor 2 is prevented from damaging the electrode foils and the separators 16 and is increased in the reliability.

(2) Since the capacitor element 6 is crimped at a plurality of separated positions, the capacitor element 6 can be prevented from vibrating with the crimped parts as a supporting point in the exterior case 4.

(3) The sealing body 10 integrated with the capacitor element 6 is stored in the exterior case 4, and the curling process on the opening side of the exterior case 4 and the crimping process on the circumferential surface side of the sealing body 10 are executed before the crimping process on the capacitor element 6 side. As a result, the capacitor 2 can limit the variation range of the capacitor element 6 in the storage part 5 so that the identification of the crimping positions and the pressing process can accurately be executed.

(4) By using the length information of the capacitor element 6, the length information of the external terminals 8A, 8B, the height information of the sealing body 10, etc., preliminarily measured, the arrangement positions of the connecting parts 22A, 22B in the storage part 5 are assumed so as to set the positions of the crimped part 12B, 12C. As a result, the crimped parts 12B, 12C are set while avoiding the case position E of the tip portions of the connecting parts 22A, 22B invisible from the outside.

(5) The circumferential surface of the capacitor element 6 is provided with one or both of the first crimped part 12B pressing on the connecting parts 22A, 22B of the external terminals 8A, 8B and the second crimped part 12C pressing a case position at which the connecting parts 22A, 22B are not connected.

(6) The capacitor 2 has the first crimped part 12B formed at a position closer to the sealing body 10 as compared to the position E of the tip portions of the connecting parts 22A, 22B and the second crimped part 12C formed at a position closer to the bottom surface of the exterior case 4 as compared to the case position E in the storage part 5. Since the exterior case 4 and the capacitor element 6 are integrated at a plurality of positions away from the position E in the storage part 5, the vibration of the capacitor element 6 is suppressed in the storage part 5 and the electrode foils can be prevented from causing the breakage etc. due to an excessive load to portions of the external terminals 8A, 8B.

Second Embodiment

Figure 5:
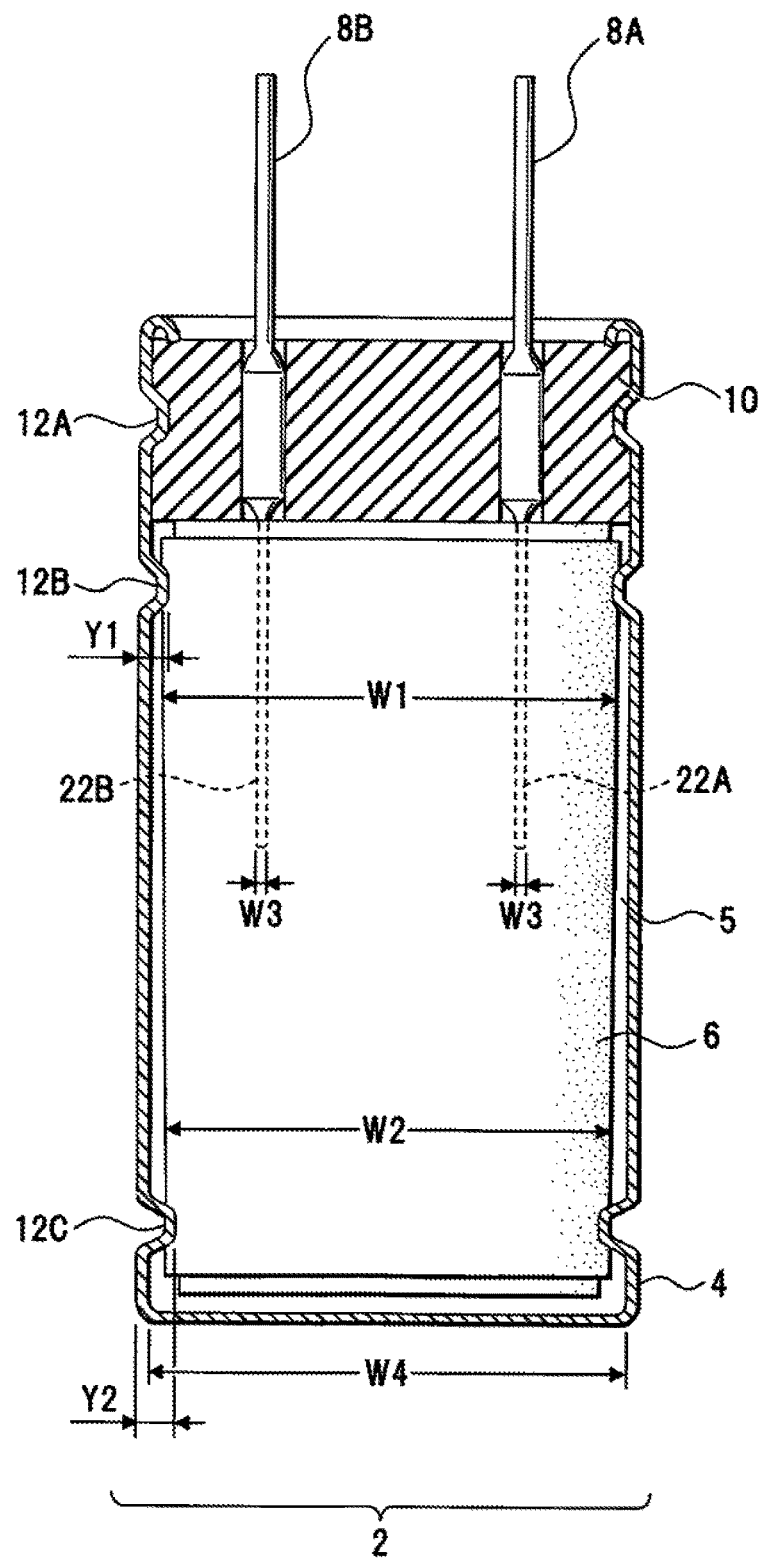
FIG. 5 is a diagram of an example of configuration inside a capacitor according to a second embodiment.

FIG. 5 shows an example of configuration of a capacitor according to a second embodiment.

With regard to this capacitor element 6, as shown in FIG. 5, the capacitor element 6 has an outer diameter, i.e., an element diameter, differing depending on a position in the height direction of the cylindrical portion, for example. In the capacitor element 6, an element diameter W1 of a portion on the upper side with the external terminals 8A, 8B present therein is larger than an element diameter W2 of a portion on the bottom side. In other words, the difference in the element diameter in this case is generated by the presence or absence of the connecting parts 22A, 22B having a width W3.

The capacitor 2 and the capacitor element 6 of this embodiment may be configured in the same way as the first embodiment. The shapes and the arrangement positions of the terminal components as well as the process of determining the formation positions of the crimped parts 12A, 12B in the height direction of the capacitor element 6, etc. are the same as those of the first embodiment. In this embodiment, the same constituent portions as those of the first embodiment are denoted by the same reference numerals and will not specifically be described.

<Crimping Process>

The exterior case 4 has, for example, an inner diameter W4 of the storage part 5 formed as a constant size regardless of the height direction. On the other hand, since the element diameter of the capacitor element 6 is not constant, a gap between the inner wall of the storage part 5 and the capacitor element 6 differs depending on the element diameters W1, W2 of the capacitor element 6, in the capacitor 2.

So, in the capacitor 2, crimping amounts Y1, Y2 of the crimped part 12B and the crimped part 12C are set to different values for the set crimping positions in accordance with the element diameter of the capacitor element 6. The crimping amounts Y1, Y2 are depths of grooves formed by deforming the exterior case 4 inward by pressing. The crimped part 12B is crimped based on the element diameter W1 that is a large diameter portion of the capacitor element 6. The crimped part 12C is crimped based on the element diameter W2 that is a small diameter portion at a position different from the crimped part 12B in the height direction of the capacitor element 6.

In the crimping process with the crimping amounts Y1, Y2, a crimping amount is determined and adjusted based on a difference value between the element diameter W1 of the capacitor element 6 located at the position of the crimped part 12B and the element diameter W2 of the capacitor element 6 located at the position of the crimped part 12C. In other words, the crimping amount is set to a smaller value in the crimped part 12B from which a gap is small to the inner wall of the exterior case 4, as compared to the crimped part 12C. For example, the difference in crimping amount is set by following Eq. (1):

$$(Y2-Y1)=(W1-W2)/2 \qquad (1).$$

By adjusting the crimping amount in this way, the crimped parts 12B, 12C are equal in amount of press bonding of the exterior case 4 to the exterior surface of the capacitor element 6, i.e., amount of deformation of the capacitor element 6 at the crimped parts 12B, 12C, although different in crimping amount.

Function and Effect of Second Embodiment (1) By setting different crimping amounts depending on a difference in element diameter at the crimping positions as a plurality of crimping amounts for the capacitor element 6 sealed in the exterior case 4, this capacitor 2 can prevent the electrode foils from being damaged due to a partially-applied excessive pressing force. As a result, the reliability of the capacitor 2 is increased.

(2) By setting different crimping amounts at the crimping positions different in the element diameter, the pressing force by the exterior case 4 to the capacitor element 6 is stabilized and the fixing strength of the capacitor element 6 is increased against the vibration due to a force from the outside.

(3) Since the capacitor element 6 is crimped at a plurality of positions separated in the height direction, the capacitor element 6 is prevented from vibrating in the lateral direction of the exterior case 4 with the crimped parts as a central point.

(4) By making the pressing force to the capacitor element 6 constant in the crimped parts 12B, 12C, the capacitor element 6 can be prevented from being partially twisted or bent, and a load due to vibration can be prevented from becoming excessive toward the crimped part with a weak fixing force.

(5) Since a position overlapping with the external terminals 8A, 8B is crimped by any of a plurality of the crimped parts 12B, 12C, the pressing load to the external terminals 8A, 8B can be reduced. In other words, since the external terminals 8A, 8B are formed to have lengths and positions preventing the external terminals 8A, 8B from overlapping with all the crimping positions P1, P2 subjected to the crimping process, the capacitor 2 can reduce the possibility of the external terminals 8A, 8B damaging the electrode foils and the separators 16 due to the pressing force associated with the crimping process. Additionally, by setting the different crimping amounts in the crimped parts 12B, 12C to make the pressing force to the capacitor element 6 constant, the vibration resistance can be improved in accordance with the improvement in the fixing force of the capacitor element 6.

(6) In the capacitor 2, the connecting parts 22A, 22B of the external terminals 8A, 8B are shorter than the height of the capacitor element 6 so that a portion in which the connecting parts 22A, 22B are not interposed is formed inside capacitor element 6 in the height direction of the capacitor 2. The cross-sectional shape of the portion in which the connecting parts 22A, 22B are not interposed is close to a perfect circle, and the pressing force due to the crimping process is more easily made constant. The capacitor 2 crimped at such a perfect circle portion is improved in the fixedly supporting force and is also improved in the vibration resistance in the whole of the capacitor 2.

Third Embodiment

The capacitor 2 is formed with the first crimped part 12B and the second crimped part 12C separated from each other on the side surface of the exterior case 4. A separation distance between the crimped part 12B and the crimped part 12C is determined depending on an electrode foil width etc. of the capacitor element 6 in the storage part 5.

The capacitor 2 and the capacitor element 6 of this embodiment may be configured in the same way as the first embodiment or the second embodiment. The shapes and the arrangement positions of the terminal components as well as the process of determining the formation positions of the crimped parts 12A, 12B in the height direction of the capacitor element 6, etc. are the same as those of the first embodiment or the second embodiment. In this embodiment, the same constituent portions as those of the first embodiment or the second embodiment are denoted by the same reference numerals and will not specifically be described.

<Example of Configuration of Capacitor Element>

For example, the capacitor element 6 is in a laminated state in which the separators 16 are interposed between the anode foil 18 and the cathode foil 20. The capacitor element 6 has a columnar shape formed by rolling the anode foil 18, the cathode foil 20, and the separators 16 kept in the laminated state into a pillar shape with the wrapping stop tape 14 (FIG. 6) wrapped around the outer circumferential portion of the rolled anode foil 18, cathode foil 20, and separators 16. The wrapping stop tape 14 is, for example, a paper or insulating tape having a width at least equal to that of the electrode foils and covers the circumference of the electrode foils. When the wrapping stop tape 14 is wrapped around more times, a function of protecting the electrode foils becomes higher.

On this anode foil 18, burrs 24 such as break marks due to a cutting blade remain along, for example, side surface portions and surfaces serving as end surface portions of the capacitor element 6. In the processing of the anode foil 18, for example, surfaces of an aluminum foil made wider than the height of the capacitor element 6 is subjected to an etching process and a chemical conversion coating process and the aluminum foil then subjected to a cutting process to a predetermined length.

The burrs 24 are not necessarily left on the anode foil 18, and a cut surface may be formed into a planar shape without the burrs 24. Additionally, the burrs 24 are not necessarily generated on both side surfaces of the anode foil 18 and, for example, the burrs 24 may be generated on only one side surface. The burrs 24 are generated due to, for example, a state of action of a force in the direction of cutting the anode foil 18, a change in a pull force during processing to the anode foil 18, etc.

<Setting of Crimping Position>

Figure 6:
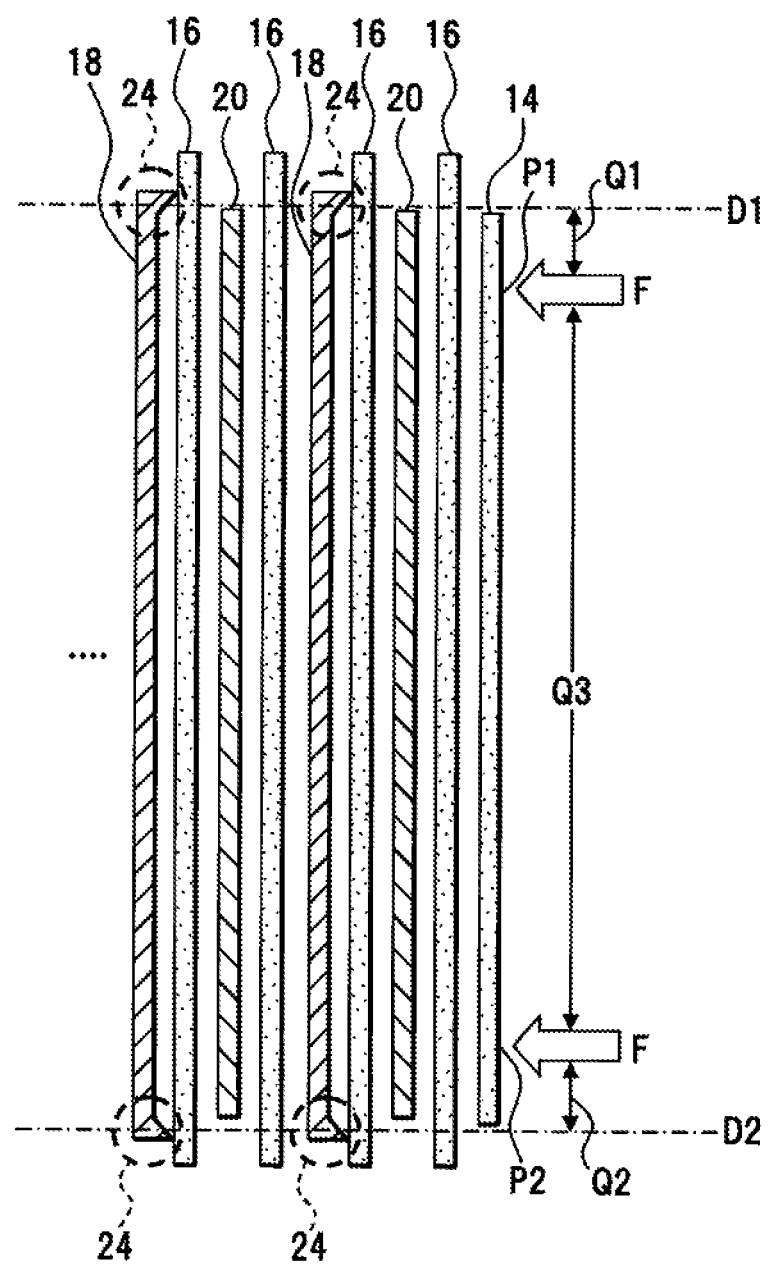
FIG. 6 is a diagram of an example of setting of a crimping position with respect to the electrode foils.

FIG. 6 shows a cross section of the capacitor element 6 taken in the longitudinal direction and shows a pressed portion of the capacitor element 6 subjected to the crimping process.

In the capacitor element 6, the separators 16 are made longer than the anode foil 18 and the cathode foil 20, and are formed to prevent the anode foil 18 and the cathode foil 20 from coming into direct contact with each other. In this case, the burrs 24 generated on the anode foil 18 are in a protruding state in a cross direction relative to a planar portion of the anode foil 18 facing the separators 16, for example. In particular, tip portions of the burrs 24 are directed to planar portions of the separators 16, for example. Consequently, the burrs 24 of the anode foil 18 are brought into contact with the flat portions of the separators 16 in end surface portions D1, D2 forming end surfaces of the roll of the capacitor element 6 or are put into a biting state due to the press bonding to the planar portions. The separators 16 are pressed by the burrs 24 when the capacitor element 6 is rolled. The anode foil 18 is made longer than the cathode foil 20. Consequently, even if the burrs 24 penetrate the separators 16, the cathode foil 20 does not exist in portions facing the burrs 24 and, therefore, a short circuit can be prevented, so that the reliability of the capacitor 2 is further increased.

Then, in the manufacturing process of the capacitor element 6, for example, positions at least at predetermined lengths Q1, Q2 from the end surface portions D1, D2 are set as the crimping positions P1, P2. The crimping positions P1, P2 are modified into the crimped parts 12B, 12C. In the capacitor element 6, the crimped parts 12B, 12C are formed to be largely separated from each other in the height direction of the capacitor element 6. A length Q 3 between the crimped parts 12B, 12C is an example of an interval set in the height direction of the capacitor element 6 of the present disclosure and is set based on the lengths Q1, Q2 from the end surface portions D1, D2. The predetermined lengths Q1, Q2 may be set equal to or longer than a planar portion of a crimping groove formed on a portion of the exterior surface of the exterior case 4 or the circumferential surface of the capacitor element 6 by the crimping process, for example. As a result, even if the crimping process is applied to the capacitor element 6, the portions with the burrs 24 generated are prevented from being crimped.

By setting the positions close to the end surfaces of the roll of the capacitor element 6 and not overlapping with the end surface portions D1, D2 of the anode foil 18 as the crimping positions P1, P2, the capacitor 2 can reduce the pressing load to the exterior case 4 due to the crimping process and can prevent the damage to the electrode foils and the separators 16 due to the burrs 24.

Function and Effect of Third Embodiment (1) The capacitor 2 is formed such that the end surface portions of the capacitor element 6 are not pressed due to the crimping process. Specifically, the crimped parts 12B, 12C of the capacitor 2 are set to positions displaced toward the center of the element from the end surface portions D1, D2 of the anode foil 18. As a result, since no excessive pressing force is applied to the burrs 24 generated on the end surface portions of the anode foil 18, the damage to the electrode foils and the separators 16 can be prevented, and the reliability of the capacitor 2 can be increased.

(2) The capacitor 2 is improved in the support strength by crimping and integrating the side surface portion of the capacitor element 6 at least at two positions with the exterior case 4, so that the external terminals 8A, 8B can be prevented from being broken due to vibrations of portions of the external terminals 8A, 8B connected to a substrate etc. or due to an excessive load partially acting.

(3) By separating the crimped parts 12B, 12C by a certain distance on the side surface of the capacitor element 6, the capacitor element 6 does not vibrate in the storage part 5 based on the crimped parts 12B, 12C with the crimped parts 12B, 12C as a supporting point, so that the fixing strength can be increased. If positions supporting the capacitor element 6 with the crimped parts are concentrated, the capacitor element 6 vibrates with the crimped parts as a supporting point, the stress generated by the vibration concentrates at the external terminals 8A, 8B, and the external terminals 8A, 8B possibly break. However, by crimping the capacitor element 6 on the upper and lower end sides, the crimped parts can be separated, so as to suppress the vibration of the capacitor element 6 in the storage part 5. In this case, the crimped parts 12B, 12C may be located at positions across the center of gravity of the capacitor 2. By pressing and fixing the capacitor element 6 across the center of gravity, the vibration of the capacitor element 6 in the exterior case 4 can further be prevented. The supporting strength of the capacitor element 6 inside the exterior case 4 etc. is determined depending on the positions of these crimped parts 12B, 12C.

(4) The crimped parts 12B, 12C may be formed to be separated by at least the distance of the length of the crimping groove from the respective end surface sides of the anode foil 18.

(5) Since the support strength between the exterior case 4 and the capacitor element 6 can be increased without increasing the number of the crimped parts for the capacitor 2, the pressing load to the capacitor element 6 can be prevented from increasing, and it can be suppressed that a mechanical stress etc. influences the electrical characteristics of the electrode foils.

Fourth Embodiment

Figure 7:
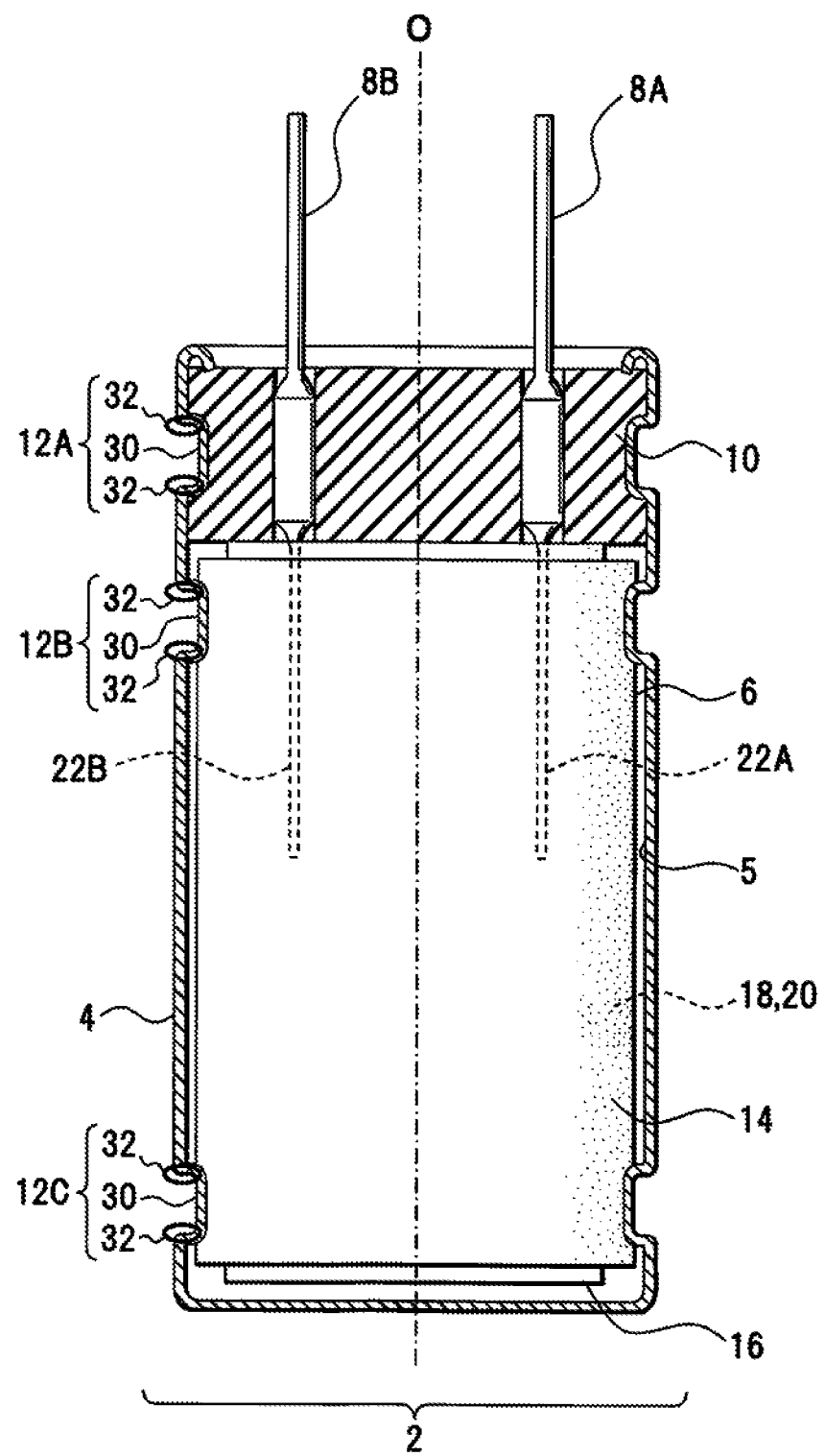
FIG. 7 is a diagram of an example of an arrangement configuration inside a case of the capacitor.

FIG. 7 shows an example of arrangement configuration inside the case of the capacitor. The configurations of the capacitor and the capacitor element shown in FIG. 7 are an example, and the present invention is not limited to this configuration. The configurations of the capacitor element 6, the exterior case 4, the external terminals 8A, 8B, and the sealing body 10; the manufacturing process of the capacitor 2; the configuration of the crimped parts; and the crimping processing method may be the same as those of the first embodiment, the second embodiment or the third embodiment and the details thereof will not be described.

<Shape of Crimped Parts 12>

In each of the crimped parts 12A, 12B, 12 C, a planar portion 30 pressed in a planar shape of a predetermined length is formed on the circumferential surfaces of the capacitor element 6 and the sealing body 10. This planar portion 30 is parallel or approximately parallel to a center axis O in the height direction of the storage part 5 of the exterior case 4, for example. As a result, the crimped parts 12A, 12B, 12C pressure-bond to, fix to and support the side surfaces of the capacitor element 6 and the sealing body 10 in the storage part 5 with linear surfaces.

In each of the crimped parts 12A, 12B, 12C, the planar portion 30 is provided with bent portions 32 coupled to the exterior surface of the exterior case 4. The bent portions 32 are peripheral edge portions on the planar portion 30 that is the bottom surface portion of the crimping groove. The bent portions 32 are formed by pressing at the time of the crimping process, are boundary portions between the exterior surface of the exterior case 4 and the planar portion 30 and include portions bent toward the central portion side of the exterior case 4 by the crimping process and portions extended in accordance with the crimping depth. The bent portions 32 are formed along the side surface portions formed around a pressing surface of a crimping die used for executing the crimping process, for example.

In the crimped parts 12B, 12C, an inner wall surface of the planar portion 30 contacts the circumferential surface of the capacitor element 6 in parallel. In other words, the planar portion 30 is brought into surface contact with a contact surface on the capacitor element 6 by a substantially uniform pressing force. A length Z1 of the groove to the planar portion 30 is a crimping width and may be set in accordance with the outer diameter of the capacitor element 6 at the crimping position and the outer diameter of the capacitor 2.

Features and Effects of Fourth Embodiment (1) Since the pressing surface against the capacitor element 6 is formed into a planar shape so as not to form a portion in which the pressing force concentrates on a portion of the crimped parts 12, the influence of the pressing force does not become excessive, so that the electrode foils and the separators 16 can be prevented from being damaged.

(2) Since the formation of the planar portion 30 increases the supporting area for the capacitor element 6, the capacitor element 6 in the exterior case 4 etc. can firmly be supported against the vibration externally applied to the capacitor 2, so that the vibration resistance can be enhanced.

(3) Even if the capacitor element 6 independently shakes in the exterior case 4 due to, for example, the externally applied vibration, the external terminals 8A, 8B can be prevented from causing the deformation and the damage by improving the vibration resistance due to crimping, so that the reliability of the capacitor 2 can be increased.

Other Embodiments (1) Although the first crimped part 12B and the second crimped part 12C are each formed as a single crimped part on the circumferential surface of the capacitor element 6 in the description of the embodiments, this is not a limitation. For example, pluralities of the first crimped parts 12B and the second crimped parts 12C may be formed. In this case, the numbers of the first crimped parts 12B and the second crimped parts 12C formed on the capacitor 2 may be the same as or different from each other. The number of formed crimped parts may be set based on the balance of force acting on the whole of the capacitor element 6, for example, or may be increased or decreased depending on the position E of the tip portions of the connecting parts 22A, 22B.

(2) This capacitor 2 can be applied not only to electrolytic capacitors and electric double layer capacitors, but also to various capacitors and other electric storage elements.

(3) Although the length of the wrapping stop tape 14 is made equal to the length of the rolled electrode foils in the description of the embodiments, this is not a limitation. Since the wrapping stop tape 14 only needs to be disposed in accordance with portions of the crimped parts 12B, 12C on the capacitor element 6, the wrapping stop tape 14 may be formed to have a length equal to or greater than the groove length of the crimped parts 12B, 12C, for example, and may be disposed in accordance with the portions corresponding to the crimped parts 12B, 12C on the capacitor element 6. This eliminates the need to change the length of the wrapping stop tape 14 depending on the length of the capacitor element 6 and the wrapping stop tape 14 can be used for the capacitor element 6 of various lengths, so that an effect of reducing material costs can be expected, including a reduction in amount of the wrapping stop tape 14 used.

(4) Although the element shape of the capacitor element 6 in the crimped part 12B is elliptical due to the interposition of the connecting parts 22A, 22B, and the element shape of the capacitor element 6 in the crimped part 12C is a shape close to a perfect circle in the embodiments, this is not a limitation. Based on the change in the shape of the capacitor element 6 due to the interposition of the connecting parts 22A, 22B, the capacitor element 6 may initially be rolled into an elliptical shape, for example, and then be rolled into a perfect circle because of the interposition of the connecting parts 22A, 22B. As a result, the capacitor element 6 can have the element shape that is a perfect circle or a shape close thereto, as is the case with the exterior case 4, in the portion disposed with the connecting part 22A, 22B at which the element diameter is large, so that the volume efficiency of the capacitor element 6 with respect to the exterior case 4 can be expected to be improved.

Aspects of capacitors or manufacturing methods for the capacitors extracted from the embodiments described above are as follows.

An aspect of a capacitor comprises a capacitor element having electrode foils on the anode side and the cathode side laminated via separators, connecting parts of terminal components being disposed inside a laminated portion of the electrode foils and the separators, the connecting parts being connected to the electrode foils on the anode side and the cathode side; and a case that includes a storage part storing the capacitor element and having an opening portion sealed by a sealing body, that has a crimped part crimped from the outside of the storage part toward a side surface of the capacitor element, and that holds the capacitor element with the crimped part, wherein the case is crimped to form the crimped part while avoiding a position at which the electrode foils of the capacitor element in the storage part overlap with tip portions of the connecting parts of the terminal components.

In the capacitor, preferably, the crimped part may include one or both of a first crimped part crimping a position at which the electrode foils overlap with the connecting parts of the terminal components and a second crimped part crimping a circumferential surface of the capacitor element at a position at which the electrode foils do not overlap with the connecting parts.

In the capacitor, preferably, the terminal components may include the connecting parts on one end side, a length of the connecting parts being shorter than a length of the capacitor element, and the case may have the crimped parts formed at least at two positions different in height for the side surface of the capacitor element in the storage part such that an amount crimping on the case is differentiated between the first crimped part and the second crimped part depending on a difference in element diameter of the capacitor element.

In the capacitor, preferably, the crimped parts may be at least two crimped parts formed on the capacitor element at set intervals, and the crimped parts may be separated from the end surface sides of the electric foils at least at a distance corresponding to a length of a crimping groove formed by the crimping.

In the capacitor, preferably, the crimped parts may be at least two crimped parts formed on the capacitor element at set intervals, and the case may be crimped at positions across the center position of the capacitor element or the position of the center of gravity of the capacitor element so as to from the crimped parts.

In the capacitor, preferably, the crimped parts may each include a planar portion having a contact surface of a predetermined length formed by pressing against a circumferential surface of the capacitor element in the storage part toward the center of the case, and bent portions formed on both end sides of the planar portion and bent between the planar portion and an outer circumferential surface of the case.

An aspect of a manufacturing method for a capacitor comprises the steps of forming a capacitor element having electrode foils on the anode side and the cathode side laminated via separators, connecting parts of terminal components being disposed inside a laminated portion of the electrode foils and the separators, the connecting parts being connected to the electrode foils on the anode side and the cathode side respectively; crimping a case that includes a storage part from the outside of the storage part toward a side surface of the capacitor element to form a crimped part holding the capacitor element, the storage part storing the capacitor element and having an opening portion sealed by a sealing body; calculating a position at which tip portions of the connecting parts of the terminal components are located with respect to the inside of the capacitor element; and setting a crimping position while avoiding the calculated position overlapping with the tip portions of the connecting parts of the terminal components.

The capacitors and the manufacturing methods for the capacitors of the embodiments provide any of the following effects.

(1) By improving fixation between the case and the capacitor element, the capacitor element and the terminal components can be prevented from being damaged due to vibrations from the outside and the stability of operation of the capacitor can be maintained.

(2) By applying the crimping process while avoiding the end portion side of the terminal components having many corner portions, the damage of the electrode foils and the separators can be prevented and the function of the capacitor can be stabilized to increase the reliability of the capacitor.

(3) The capacitor element in the case can be restrained from independently vibrating due to vibrations acting on the capacitor from the outside of the capacitor such as vibrations of equipment on which the capacitor is mounted, and the load to the terminal components can be reduced to prevent damage.

As described above, the most preferable embodiments etc. of the capacitors and the manufacturing methods therefor of the present invention have been described. The present invention is not limited to the above descriptions and can variously be modified and altered by those skilled in the art based on the spirit of the invention described in claims or disclosed in modes for carrying out the invention. These modifications and alterations obviously fall within the scope of the present invention.

The present invention provides a capacitor having a capacitor element stored in an exterior case and crimped by pressing a circumferential surface of the exterior case and is useful because a damage to electrode foils and separators can be prevented and the reliability of the capacitor can be maintained by avoiding the crimping at the tip portions of the connecting parts having many corner portions or at the burrs of the electrode foils.

The invention claimed is:

1. A capacitor, comprising:
    a capacitor element having electrode foils on an anode side and an cathode side laminated via separators, connecting parts of terminal components being disposed inside a laminated portion of the electrode foils and the separators, the connecting parts being connected to the electrode foils on the anode side and the cathode side; and
    a case that includes a storage part storing the capacitor element and having an opening portion sealed by a sealing body, the case including crimped parts crimped from the outside of the storage part toward a side surface of the capacitor element, the capacitor element being fixed with the crimped parts,
    wherein the terminal components include the connecting parts on one end side, a length of the connecting parts being shorter than a length of the capacitor element,
    wherein the case is crimped to form the crimped parts at positions overlapping with the electrode foils of the capacitor element, and not in a position at which the electrode foils of the capacitor element in the storage part overlap with tip portions of the connecting parts of the terminal components,
    wherein the crimped parts are formed at least at two positions different in height for the side surface of the capacitor element in the storage part,
    wherein the crimped parts include a first crimped part and a second crimped part, the first crimped part being at a position overlapping with the electrode foils of the capacitor element and crimping a position at which the electrode foils overlap with the connecting parts of the terminal components, the second crimped part being at a position overlapping with the electrode foils of the capacitor element and crimping the side surface of the capacitor element at a position at which the electrode foils do not overlap with the connecting parts,
    wherein the first crimped part and the second crimped part have a different amount of crimping, and
    wherein an amount of crimping on the case is differentiated between the first crimped part and the second crimped part depending on a difference in element diameter of the capacitor element.

2. The capacitor according to claim 1, wherein
    the crimped parts are at least two crimped parts formed on the capacitor element at set intervals, and wherein
    the crimped parts are separated from the end surface sides of the electric foils at least at a distance corresponding to a length of a crimping groove formed by the crimping.

3. The capacitor according to claim 1, wherein
    the crimped parts are at least two crimped parts formed on the capacitor element at set intervals, and wherein
    the case is crimped at positions across the center position of the capacitor element or the position of the center of gravity of the capacitor element so as to from the crimped parts.

4. The capacitor according to claim 1, wherein
    the crimped parts each include
    a planar portion having a contact surface of a predetermined length formed by pressing against the side surface of the capacitor element in the storage part toward the center of the case, and
    bent portions formed on both end sides of the planar portion and bent between the planar portion and an outer circumferential surface of the case.

5. A manufacturing method for a capacitor, comprising the steps of:
    forming a capacitor element having electrode foils on an anode side and a cathode side laminated via separators, connecting parts of terminal components being disposed inside a laminated portion of the electrode foils and the separators, the connecting parts being connected to the electrode foils on the anode side and the cathode side respectively, wherein the terminal components include the connecting parts on one end side, a length of the connecting parts being shorter than a length of the capacitor element;
    calculating a position at which tip portions of the connecting parts of the terminal components are located with respect to the inside of the capacitor element;
    setting crimping positions at positions overlapping with the electrode foils of the capacitor element, and not in the calculated position overlapping with the tip portions of the connecting parts of the terminal components; and
    crimping a case that includes a storage part from the outside of the storage part toward a side surface of the capacitor element at the crimping positions to form crimped parts fixing the capacitor element, the storage part storing the capacitor element and having an opening portion sealed by a sealing body,
    the crimped parts being formed at least at two positions different in height for the side surface of the capacitor element in the storage part, the crimped parts including a first crimped part and a second crimped part, the first crimped part being at a position overlapping with the electrode foils of the capacitor element and crimping a position at which the electrode foils overlap with the connecting parts of the terminal components, the second crimped part being at a position overlapping with the electrode foils of the capacitor element and crimping the side surface of the capacitor element at a position at which the electrode foils do not overlap with the connecting parts, the first crimped part and the second crimped part having a different amount of crimping, an amount of crimping on the case being differentiated between the first crimped part and the second crimped part depending on a difference in element diameter of the capacitor element.

\* \* \* \* \*